Patented June 20, 1944

2,352,059

UNITED STATES PATENT OFFICE 2,352,059

TREATMENT OF HYDROCARBONS

Paul Woog, Paris, France; vested in the Alien Property Custodian

No Drawing. Application April 19, 1940, Serial No. 330,613. In France May 6, 1939

1 Claim. (Cl. 196—27)

The object of the present invention is an improvement in the treatment of hydrocarbons in order to increase their anti-knock properties, by subjecting them to a catalytic desulfurizing and reforming in the presence of sulphur derivatives.

The reaction on which the process is based is the transformation of organic combinations of sulphur by heat, in the zone of 300 to 500° C., in the presence of suitable catalysts and in contact with the fuel to be treated.

The catalyst used may be cadmium, molybdenum, tungsten sulphide, natural or activated clayey earths, alumina, magnesia, quick-lime, silica gel, pumice-stone, kieselguhr, active charcoal, alkaline-earth silicates or mixtures of these substances.

The sulphuretted molecules required for the foregoing reactions (neutral sulphides, mercaptans, etc. etc.) may be molecules that exist naturally in the products to be treated; use may also be made of artificially prepared sulphuretted molecules or of molecules that exist naturally in some sulphuretted products other than liquid hydrocarbon fuels (oils of sulphurized schists, residues of washing or refining processes, suitable fractions of sulphurized petroleums, etc.). Motor fuels which are naturally sulphurized may therefore be enriched in organic sulphur in order to make them capable of being subjected to a more efficient treatment; on the other hand, unsulphurized motor fuels may also be treated after the addition of suitable quantities of sulphuretted products.

The elimination of the sulphur, which is effected in the form of sulphuretted hydrogen should lead to the presence of free valences which are capable of reacting and of uniting with other molecules which are substituted for the sulphur.

By way of example, the reaction may be written:

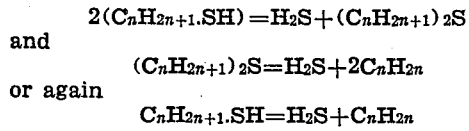

In these equations, it is the member $C_nH_{2n}$ which is capable of uniting with other molecules, thereby converting the aliphatic, aromatic or cyclo paraffins into branched or substituted hydrocarbons.

It is known that branched hydrocarbons generally possess more marked anti-knock properties than unbranched hydrocarbons.

It is possible, moreover, that independently of the branching phenomena, the sulphuretted organic molecules produce, owing to the elimination of the sulphur, hydrocarbons which per se improve the average anti-knock properties of the motor fuel.

The treatment for carrying out the present process may be effected in the vapor phase or in the liquid phase, at atmospheric pressure or under pressure.

It is not outside the scope of the invention to apply the process with the known catalytic treatment apparatus and with the improvements made in catalytic treatment during the last few years.

*Example I.*—The product to be treated may be obtained for example from a crude Irak petroleum which is rich in sulphuretted organic combinations or, on the contrary, from a crude Texas petroleum to which 5 to 6% of sulphurized schist oils have been added.

The product, which has been completely vaporized in a suitable still, is introduced at atmospheric pressure into a chamber filled with catalyst.

This catalyst is raised to a temperature between 350° and 450° C. but which is so regulated as to obtain the best reaction while producing the minimum quantity of gas. With a suitable adjustment, said gas can be limited to the sulphuretted hydrogen produced by the reaction and the losses are therefore reduced to a minimum. In certain cases, it is advantageous to supply to the catalysis furnace a certain quantity of steam at the same time as the motor fuel vapors. As they issue from the catalysis furnace, the vapors are condensed, the motor fuel is optionally separated from the water, then washed with soda in order to remove the dissolved sulphuretted hydrogen. A treatment with plumbite of soda, for example, is not necessary.

It has been observed that during the operation of the catalysts the same have a tendency to become covered with a more or less substantial carbon deposit which decreases the efficiency. This deposit therefore impairs the reactions and, after some time, the catalysts have to be changed or regenerated. This regeneration may be effected by passing a current of air or steam over the worn out catalysts, care being taken to raise the temperature sufficiently to enable the reactions that destroy the carbon coating to take place.

*Example II.*—The motor fuel to be treated, which has previously been enriched in sulphuretted organic combinations, is heated in a closed vessel; the pressure which is set up in the vessel is obviously proportional to the temperature obtained. The operation may be discontinuous or continuous, the product circulating in the latter case under the effect of suitably arranged pumps. In any case, the product which has been raised to the reaction temperature is placed in the presence of similar catalysts to those referred to above.

When it issues from the reaction chamber, the motor fuel is washed with soda in order to remove the dissolved sulphuretted hydrogen.

The products obtained by means of the treatment which is the object of the present invention contain practically no sulphur. They show considerably improved anti-knock properties and a very satisfactory susceptibility to tetraethyl lead.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

A process of producing motor fuels of high anti-knock value by a desulfurizing and reforming action, which comprises completely vaporizing a light hydrocarbon oil containing from about 5 to 6 per cent of an added sulfurized schist oil, passing said vapors in contact with a reforming catalyst at a temperature within the range of about 300° to 500° C. and recovering a desulfurized and reformed motor fuel of high anti-knock value.

PAUL WOOG.